US008498947B1

(12) United States Patent
Haake et al.

(10) Patent No.: US 8,498,947 B1
(45) Date of Patent: Jul. 30, 2013

(54) INSERTING STOPS INTO DELIVERY ROUTES

(75) Inventors: Paul N. Haake, Seattle, WA (US); Dennis Lee, Mercer Island, WA (US); Sarah T. Rowe, Seattle, WA (US); Steve R. Harman, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 455 days.

(21) Appl. No.: 12/640,516

(22) Filed: Dec. 17, 2009

(51) Int. Cl.
*G06Q 30/00* (2006.01)
*G06Q 10/00* (2006.01)

(52) U.S. Cl.
USPC .......................................... 705/338; 705/7.13

(58) Field of Classification Search
USPC ................................................ 705/338, 7.13
See application file for complete search history.

(56) References Cited

U.S. PATENT DOCUMENTS

| | | | |
|---|---|---|---|
| 2001/0047285 A1* | 11/2001 | Borders et al. ................. | 705/8 |
| 2003/0084125 A1* | 5/2003 | Nagda et al. ................. | 709/219 |
| 2004/0255297 A1* | 12/2004 | Horstemeyer ................. | 718/100 |
| 2005/0075119 A1* | 4/2005 | Sheha et al. ................ | 455/456.6 |
| 2006/0235739 A1* | 10/2006 | Levis et al. ....................... | 705/9 |
| 2008/0147473 A1* | 6/2008 | Zhong et al. ....................... | 705/9 |
| 2009/0254405 A1* | 10/2009 | Hollis ............................... | 705/9 |
| 2011/0231354 A1* | 9/2011 | O'Sullivan et al. ............. | 706/46 |

OTHER PUBLICATIONS

CobornsDelivers.com (accessed Oct. 26, 2008, Available at: http://web.archive.org/web/20081026113601/http:/www.cobornsdelivers.com/FAQs.asp?ref=new&pg=delivery).*

* cited by examiner

*Primary Examiner* — Kevin Flynn
(74) *Attorney, Agent, or Firm* — Thomas|Horstemeyer LLP.

(57) ABSTRACT

Various systems and methods are described for insertion of optional stops in delivery routes. To this end, a plurality of delivery routes is provided in a computing device, where each delivery route has a plurality of stops. A determination is made in the computing devices as to whether an optional stop can be inserted between a pair of the stops in at least one of the delivery routes without violating a predefined set of criteria. The optional stop is ultimately inserted between a respective pair of stops in a selected one of the delivery routes.

24 Claims, 4 Drawing Sheets

INSERTING STOPS INTO DELIVERY ROUTES

BACKGROUND

Delivery routes are often created for delivery trucks to follow in order to distribute items. However, such delivery routes do not take into account whether optional stops can be made for various purposes.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
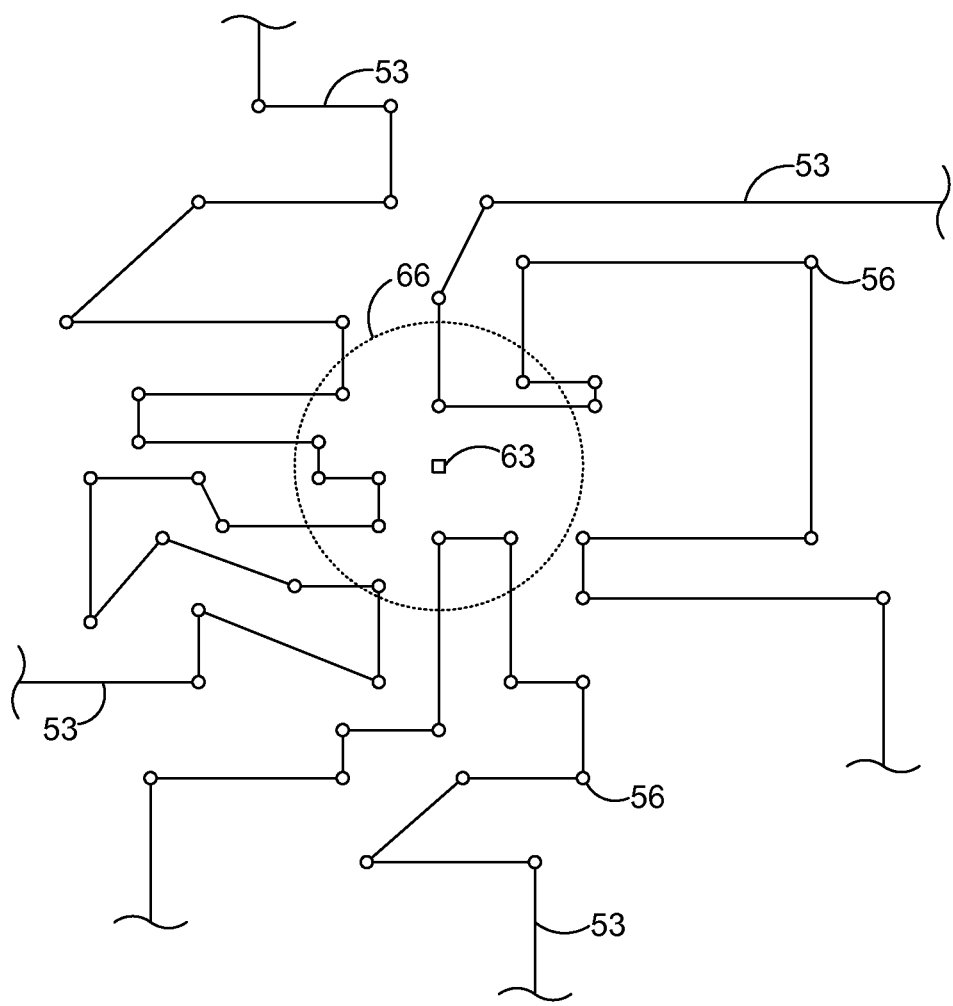
FIG. 1 is a drawing of a plurality of delivery routes according to an embodiment of the present disclosure.

Referring to FIG. 1, shown is an illustration of several different delivery routes 53 for the delivery of products to customers. To this end, according to various embodiments, products may be sold online to be delivered to residences, businesses, or other locations associated with customers. The delivery routes 53 may be created based on deliveries that have to be made during a given time period such as a day, window of hours, or other time period. The delivery routes 53 are then followed by delivery trucks or other vehicles to deliver products to customers.

Each of the delivery routes 53 traces along various roads and streets as can be appreciated. Each delivery route 53 includes a number of stops 56. The stops 56 comprise locations at which deliveries of products are to be made, or for which some other activity is to be performed such as refueling, etc. Where stops 56 are for purposes of delivering products, each of the stops 56 may comprise, for example, a residence, business, or other location.

A delivery promise window may be specified for the one or more deliveries to be made at each stop 56. A delivery promise window comprises a period of time within which the delivery is to be made that has been specified during the process of ordering the products for delivery. Such a delivery promise window is specified to provide predictability as to when a delivery will be made so that a customer can arrange to be on site at a given stop 56 at the time of delivery to receive the products. Alternatively, since the customer knows when the goods will be delivered, the customer can arrange to access products delivered at the stop 56 after they have been dropped off before environmental conditions can do harm to the products. For example, where goods comprise groceries, the heat or cold experienced where products are left outdoors at a stop 56 may cause goods to become spoiled or do damage in some other way.

According to one embodiment, the products delivered by way of a delivery route 53 to the respective stops 56 comprise groceries or other consumable goods. Alternatively, other items beyond consumable goods may be delivered to the respective stops 56. In some situations, the delivery of products to respective stops 56 is performed using totes that hold the products purchased. As contemplated herein, a "tote" is defined as a container, box, bag, case, holder, receptacle, basket, or other type of structure within which goods may be placed for delivery.

According to one embodiment, it may be necessary for delivery personnel to pick up empty totes from delivery locations at some point after they are dropped off with the purchased products as customers may not wish to keep empty totes on the premises. For example, some households located at respective stops 56 may not have the space within which to store totes until they are picked up. Accordingly, as deliveries are made, a number of totes may be located at various stops 56 that may need to be picked up by deliverymen.

In one embodiment, an optional stop 63 is provided that may be associated with a given location to pick up an empty tote. An optional stop 63 is "optional" in that it may not be necessary to perform a pickup of an empty tote right away, but rather such an optional stop 63 is made when it is convenient or expedient to do so. For example, a customer may specify during the order process that the pickup of an empty tote must take place within a predefined time period such as within a day, a week, or whenever convenient after initial delivery of the products contained in the tote. Such time periods provide flexibility as to when the tote is to be picked up. Accordingly, such time periods facilitate planning to pickup totes at a time that is most convenient or expedient for the delivery infrastructure.

According to various embodiments of the present disclosure, the optional stops 63 may be added to a respective one of the delivery routes 53 based on predefined criteria as will be described. In doing so, an area of consideration 66 may be extended around the optional stop 63. Such an area of consideration 66 may comprise, for example, a circle having a radius that is a predefined distance from the optional stop 63. Such a distance may be specified in terms of an actual distance radius, or in terms of an identified speed of transit and time for such transit relative to the optional stop 63 (i.e., a circle tracing an area that is within 10 minutes travel time around an optional stop 63 given local speed limits, etc.). As will be described, the area of consideration 66 is provided to identify stops 56 associated with respective delivery routes 53 that may be considered in determining whether an optional stop 63 is to be inserted into a respective delivery route 53.

Figure 2:
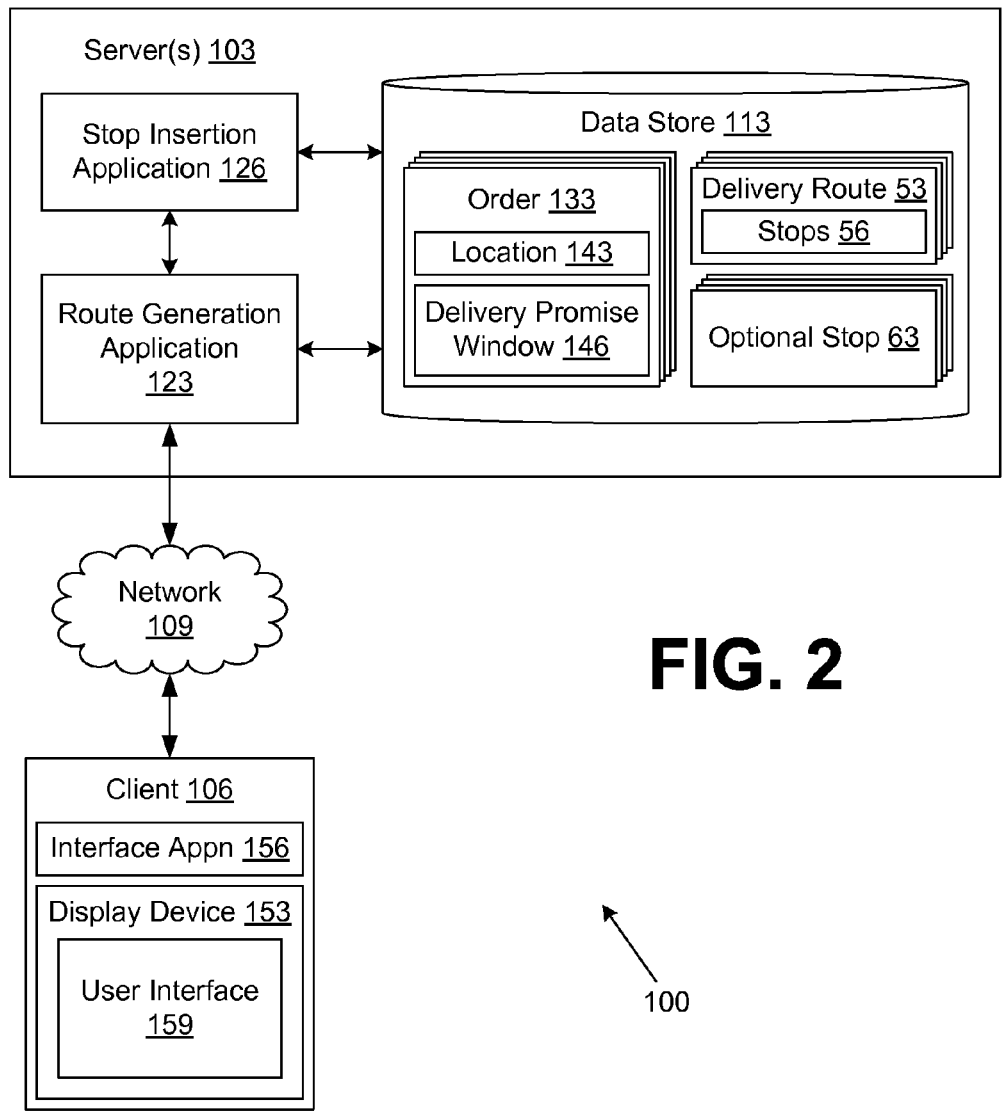
FIG. 2 is a drawing of a client-server processing arrangement that is configured to insert optional stops into the delivery routes of FIG. 1 according to an embodiment of the present disclosure.

With reference to FIG. 2, shown is an example of a client-server network 100 that includes various computing resources or devices such as one or more servers 103 and a client 106 that are coupled to a network 109. In the following discussion, first the structural aspects of the client-server network 100 are described followed by a general discussion of the operation of the same. The network 109 may comprise, for example, the Internet, intranets, extranets, wide area networks (WANs), local area networks (LANs), wired networks, wireless networks, or other suitable networks, etc., or any combination of two or more such networks. For purposes of convenience, the server 103 and the client 106 are each referred to herein in the singular. However, it is understood that in one embodiment, the server 103 may represent a plurality of servers, and the client 106 may represent a plurality of clients.

The server 103 comprises one example of a computing resource that may be employed to execute various components as described herein. The server 103 may comprise, for example, a server computer or like system, and may represent multiple servers arranged, for example, in one or more server banks or other arrangements. Such servers may be located in a single installation or may be dispersed among many different geographical locations. To this end, the server 103 may be viewed as a computing resource comprising a server "cloud," for example, that represents the computing capacity of multiple servers, etc.

Various applications and/or other functionality may be executed in the server 103 according to various embodiments. Also, various data is stored in a data store 113 that is accessible to the server 103. The data store 113 may be representative of a plurality of data stores as can be appreciated. The data stored in the data store 113, for example, is associated with the operation of the various applications and/or functional entities described below. The components executed on the server 103, for example, include a route generation application 123, a stop insertion application 126, and other applications, services, engines, or functionality not discussed in detail herein.

The data stored in the data store 113 includes, for example, orders 133 for the purchase of products such as goods and/or services, and delivery routes 53 that are used to deliver the products that are the subject of the orders 133 to customers. Associated with each of the orders 133 are a location 143 and a delivery promise window 146. The location 143 comprises an address or other type of location information indicating the physical location of a customer who placed the order 133. The delivery promise window 146 is a window of time during a specified day within which the products are to be delivered to the customer. In addition, other information may be associated with the order 133 such as a listing of the products purchased, customer account information, etc. As contemplated herein, the term "products" refers to goods and/or services.

Each of the delivery routes 53 includes one or more stops 56 at which products or other items are to be delivered. In addition, data that describes optional stops 63 is stored in the data store 113. In one embodiment, the products are delivered in a tote or other container that may need to be picked up after being emptied by the customer. The optional stops 63 may be scheduled at various locations 143 in order to pick up the empty totes. Optional stops 63 are "optional" in that it is not mandatory that such optional stops 63 be made at a given time, as opposed to stops 56 that are necessary in order to deliver products to a customer in a timely manner. In addition, other data may be stored in the data store 113.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 153, indicator lights, speakers, etc. The display device 153 may comprise, for example, cathode ray tubes (CRTs), liquid crystal display (LCD) screens, gas plasma-based flat panel displays, LCD projectors, or other types of display devices, etc.

Executed within the client 106 are various applications including an interface application 156. The interface application 156 is configured to interact with the route generation application 123 and potentially other applications on the server 103. In one embodiment, the interface application 156 may comprise a browser application that operates according to an appropriate protocol such as the Internet Protocol Suite comprising Transmission Control Protocol/Internet Protocol (TCP/IP) or other protocols. To this end, such a browser application may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Where the interface application 156 comprises a browser application, then the route generation application 123 and other applications may comprise web based applications that interact with the browser as can be appreciated. The interface application 156 generates one or more user interfaces 159 to facilitate interaction with a user.

Next, a general discussion of the operation of the various components depicted in the client-server network 100 is provided. To begin, it is assumed that the plurality of orders 133 for products are generated by a suitable electronic commerce system in association with interaction with various customers over the Internet or other network as can be appreciated. Associated with each of the orders 133 is a list of one or more products to be delivered to the customer as ordered (not shown), the location 143 of the customer in terms of a delivery address or other location information, and a delivery promise window 146.

The delivery promise window 146 indicates a period of time specified by the customer within which the delivery is to be made. According to one embodiment, customers may specify the delivery promise window 146 within which they desire to have the products delivered to their respective location 143. To this end, several potential delivery promise windows 146 may be presented to a customer at the time they purchase the products from which they may select for the delivery of the products to the location 143.

Assuming that orders 133 have been created and are stored in the data store 113, then the route generation application 123 is executed in order to generate delivery routes 53 with respective stops 56 for the delivery of the products that are the subject of the orders 133. To this end, each of the stops 56 may include one or more locations 143 where deliveries are to be made. To this end, it may be possible that two or more locations 143 are so close to each other that it may be possible to effect the deliveries to such locations 143 in a single stop 56. The route generation application 123 operates to generate the delivery routes 53 that are followed by delivery trucks or other vehicles in order to deliver the ordered products to the customers. To this end, the route generation application 123 may employ various algorithms in order to generate the delivery routes 53 as can be appreciated.

Once the delivery routes 53 have been created for a respective day or other time period, then the route generation application 123 signals to the stop insertion application 126 that it should attempt to insert optional stops 63 into the delivery routes 53 generated by the route generation application 123 based upon predefined criteria. The predefined criteria act as a threshold that dictates whether the inclusion of a given optional stop 63 is deemed convenient or efficient such that the optional stop 63 should be included. To this end, such optional stops 63 may be for the purpose of picking up empty totes or for other purposes.

The stop insertion application 126 then examines each current optional stop 63 to determine whether there is a respective delivery route 53 within which it can be inserted without disrupting the requirements for the delivery of the products in the respective stops 56 according to the predefined criteria. There may be many potential optional stops 63 to consider, for example, given the number of empty totes that may need to be picked up.

Once the stop insertion application 126 has completed inserting optional stops 56 into respective delivery routes 53, then the delivery routes 53 may be rendered for use by drivers in delivering the products. Alternatively, the delivery routes 53 may be transmitted to portable devices in the trucks that guide the drivers along the delivery routes 53 in delivering the products, or the delivery routes 53 can be provided to drivers in some other manner as can be appreciated.

Figure 3:
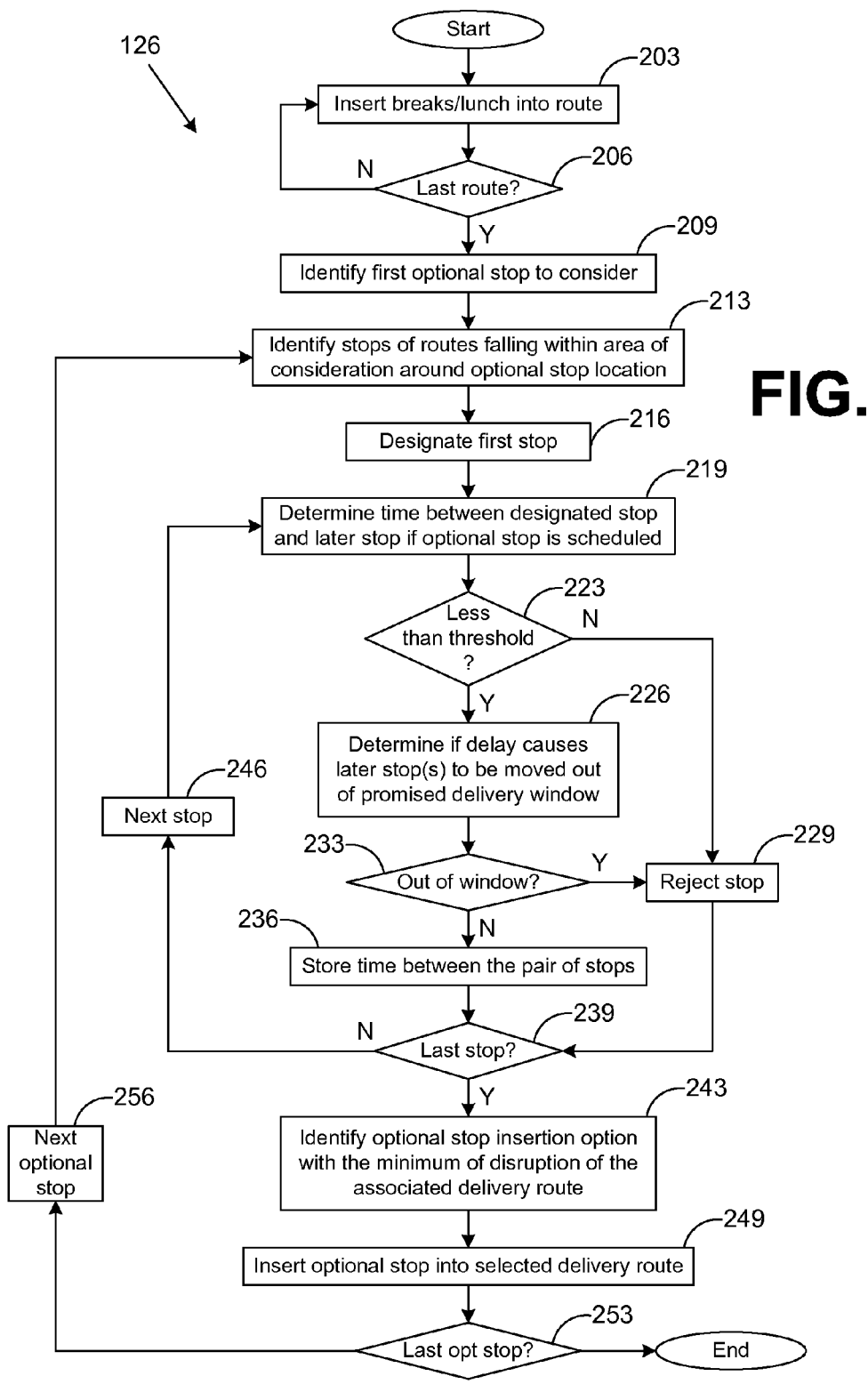
FIG. 3 is flowchart that illustrates one example of a stop insertion application implemented in a server in the client-server processing arrangement of FIG. 2 according to an embodiment of the present disclosure.

Referring next to FIG. 3, shown is a flowchart of one example of the functionality of the stop insertion application 126 according to one embodiment. Alternatively, the flowchart of FIG. 3 may be viewed as depicting steps of a method implemented in the server 103 (FIG. 2) according to various embodiments. It is understood that the flowchart of FIG. 3 is one example of the operation of the stop insertion application 126, where the stop insertion application 126 may be implemented in varying ways to accomplish the same functionality.

To begin, the stop insertion application 126 proceeds to insert breaks into each of the delivery routes 53 (FIG. 2). To this end, each route is examined to identify periods of time between stops 56 (FIG. 2) that will accommodate the predefined breaks as are mandated by various regulations. The breaks may comprise a simple stoppage of work for a period of time or may comprise a lunch break, etc. Assuming that all needed breaks have been added to the delivery routes 53 in box 206, then the stop insertion application 126 proceeds to box 209. Otherwise, the stop insertion application 126 reverts back to box 203.

In box 209, the stop insertion application 126 identifies a first optional stop 63 to be inserted into a respective one of the delivery routes 53. Thereafter, in box 213, the stop insertion application 126 identifies stops 56 of delivery routes 53 that fall within the area of consideration 66 (FIG. 1) circumscribed around the location 143 of the optional stop 63. The area of consideration 66 may be a specified distance around the optional stop 63 and may be specified in terms of a transit time (i.e. driving time of 10 minutes) and average travel speed given the location 143 and applicable speed limits, intersections, and other aspects. Alternatively, the area of consideration 66 may be defined as a circle having a radius comprising a predefined distance (i.e., 10 miles) around the optional stop 63.

Thereafter, in box 216, the stop insertion application 126 designates a first one of the stops 56 that fall within the area of consideration 66 to be analyzed. In this respect, each stop 56 that falls within the area of consideration 66 is considered one at a time to determine if the optional stop 63 can be inserted after such stop 56 and before the next adjacent stop 56 in the respective delivery route 53. Thus, when considering a specific stop 56 in this manner, in actuality the pair of stops 56 comprising the stop 56 designated as well as the next adjacent stop 56 in a delivery route 53 are considered.

Next, in box 219, the stop insertion application 126 determines the time that would elapse between the current designated stop 56 and the next adjacent stop 56 in the same delivery route 53 if the optional stop 63 was inserted between this pair of stops 56. Estimated times necessary to travel from the current designated stop 56 to the optional stop 63, to perform any tasks at the optional stop 63, and to travel from the optional stop 63 to the next adjacent stop 56 in the delivery route 53 may be assumed in order to calculate the time between the pair of stops 56 if the optional stop 63 is inserted between the pair.

Thereafter, in box 223, the stop insertion application 126 determines if the insertion of the optional stop 63 violates predefined criteria that comprises a maximum allowable amount of time between adjacent ones of the stops 56 after the insertion of an optional stop 63 between the adjacent ones of the stops 56. The stop insertion application 126 determines whether the insertion of the optional stop 63 results in a period of time spent between the respective pairs of stops 56 that is greater than a predefined threshold of time. Assuming that the time between the respective pair of stops 56 is less than the predefined threshold, then the stop insertion application 126 proceeds to box 226. Otherwise, the stop insertion application 126 proceeds to box 229 in which the respective stop 56 identified in box 216 is rejected from consideration.

Assuming that the stop insertion application 126 has proceeded to box 226, then the stop insertion application 126 determines if any delay created by inserting the optional stop 63 between the respective pair of stops 56 causes a later stop 56 in the respective delivery route 53 to be moved outside of a promise delivery window 146 (FIG. 2). For example, if the insertion of an optional stop 63 in a given delivery route 53 causes a ten minute delay to be inserted between a respective pair of stops 56, and the later stop 56 in the pair is slated to be delivered five minutes before the end of the respective promise delivery window 146 for such stop 56, then the delay would push the delivery of the respective later stop 56 of the pair beyond its delivery promise window 146. Also, it may be that the delay between a respective pair of stops 56 might cause the delivery of a later stop 56 anywhere in the delivery route 53 to move outside of a given delivery promise window 146.

According to one embodiment, predefined criteria is specified that stipulates that the insertion of a given optional stop 63 into a delivery route 53 cannot result in the missing of a delivery promise window 146 by any one stop 56 of the delivery route 53. In box 233, the stop insertion application 126 determines whether any stop 56 in the current route 53 has been pushed outside of its delivery promise window 146 due to the insertion of the optional stop 63. If so, then the stop insertion application 126 proceeds to box 239. Otherwise, the stop insertion application 126 progresses to box 236.

It should be noted that although specific criteria described herein are examined to determine whether a given optional stop 63 can be inserted between a respective pair of stops 56 of a delivery route 53, it is understood that such criteria are merely stated herein as examples and that other criteria my apply.

In box 236, the stop insertion application 126 stores the time period that results between a respective pair of stops 56 if the optional stop 63 is inserted therebetween for further consideration as will be described. Thus, at this point the respective delivery route 53 is a candidate for the insertion of the respective optional stop 63. Thereafter, the stop insertion application 126 proceeds to box 239 to determine whether the last stop 56 identified within the area of consideration 66 has been analyzed. If so, then the stop insertion application 126 proceeds to box 243. Otherwise, it reverts to box 246.

Assuming that the stop insertion application 126 has progressed to box 229 as described above, then the stop 56 that was under consideration that occurred within the area of consideration 66 is eliminated from consideration due to the fact that the respective criteria was not met. It should be noted that other stops 56 associated with the same delivery route 53 may exist that still may be considered. However, in box 229 it is determined that the pair of stops 56 in which the respective earlier of the pair is considered will not work for the insertion of the optional stops 63. After a given stop 56 is removed from consideration in box 229, then the stop insertion application 126 proceeds to box 239.

Assuming that the last stop 56 in the area of consideration 66 has not been considered in box 239, then in box 246, a next one of the stops 56 in the area of consideration 66 is designated for consideration. Thereafter, the stop insertion application 126 reverts back to box 219.

Assuming that the stop insertion application 126 determines that it has processed all of the stops 56 falling within the area of consideration 66 in box 239, then in box 243 the stop insertion application 126 identifies the optional stop 63 insertion option among those identified that results in a minimum of disruption of an associated one of the delivery routes 53. The insertion option that results in a minimum of disruption of a given delivery route 53 may be that the insertion of an optional stop 63 that results in the minimal delay between a given pair of stops 56 of a respective delivery route 53. Alternatively, some other criteria may be applied to identify which insertion of an optional stop 63 in respective delivery routes 53 presents a minimum of disruption of one of the delivery routes 53.

Thereafter, in box 249, the optional stop 63 is inserted into a selected one of the delivery routes 53 between a respective pair of stops 56 based on the determination as to which insertion of the optional stop 63 in box 243 results in the minimum of disruption as described above. Then, in box 253, the stop insertion application 126 determines whether the last pending optional stop 63 has been considered. If so, then the stop insertion application 126 ends as shown. If not, the stop insertion application 126 reverts to box 256 in which the next optional stop 63 is identified for consideration. Thereafter, the stop insertion application 26 reverts back to box 213 to begin the process anew with respect to the next identified optional stop 63.

In addition, it should be noted that the above criteria employed to determine whether an optional stop 63 can be inserted between a pair of stops 56 may be used to determine whether a break such as a lunch break may be inserted between stops 56. In this sense, the break may be considered an optional stop 63 without a specified location 143. Such a break may entail a simple delay as a delivery driver pulls off of the road for a predefined period of time or visits a restaurant for lunch, etc. The delay caused by the break may be factored in to determine, for example, whether a given stop 56 has moved beyond its delivery promise window 146, etc.

Figure 4:
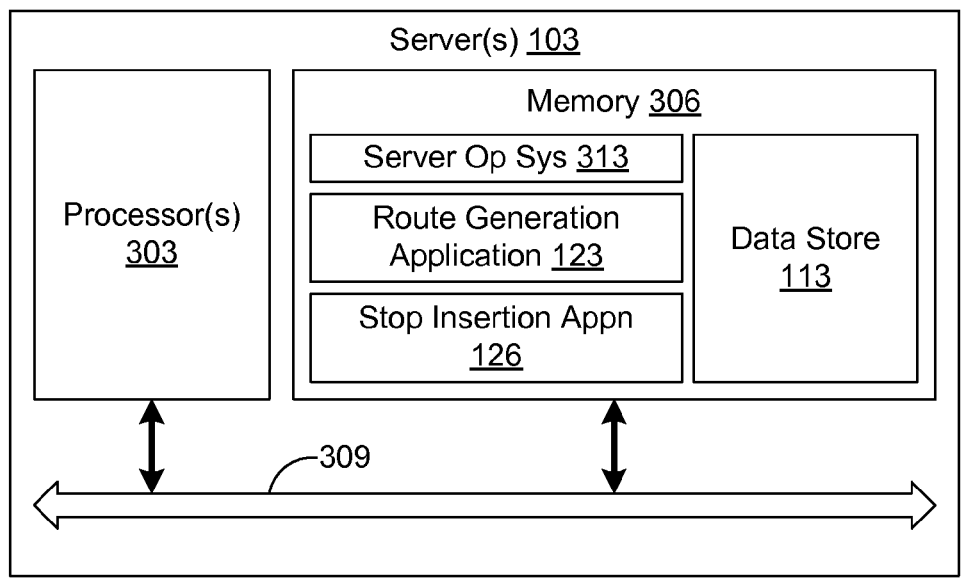
FIG. 4 is a schematic block diagram of one example of a server that may be used in the client-server processing arrangement of FIG. 2 according to an embodiment of the present disclosure.

Referring next to FIG. 4, shown is a schematic block diagram of one example of the server 103 according to an embodiment of the present disclosure. The server 103 includes at least one processor circuit, for example, having a processor 303 and a memory 306, both of which are coupled to a local interface 309. To this end, the server 103 may comprise, for example, a server computer or like device. The local interface 309 may comprise, for example, a data bus with an accompanying address/control bus or other bus structure as can be appreciated.

Stored in the memory 306 are both data and several components and/or applications that are executable by the processor 303. In particular, stored in the memory 306 and executable by the processor 303 are a server operating system 313, the route generation application 123, the stop insertion application 126, and potentially other applications such as an electronic commerce application, etc.

Also, stored in the memory 306 is the data store 113 in which are stored the various data items described above so as to be accessible to the processor 303. It is understood that other data may be stored in the memory 306 and accessed by the processors 303 beyond the data described above.

A number of software components are stored in the memory 306 and are executable or executed by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 303 may represent multiple processors and the memory 306 may represent multiple memories that operate in parallel. In such a case, the local interface 309 may be an appropriate network that facilitates communication between any two of the multiple processors, between any processor and any one of the memories, or between any two of the memories etc. The local interface 309 may comprise additional systems designed to coordinate this communication, including, for example, performing load balancing. The processor 303 may be of electrical or of some other available construction.

The various applications or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as the route generation application 123 and the stop insertion application 126 described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The block diagrams and/or flowcharts of FIGS. 2-3 show the functionality and operation of an implementation of the various applications and/or other components such as the route generation application 123 and the stop insertion application 126 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and/or other components described herein such as the route generation application 123 and the stop insertion application 126 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus, comprising:
   a computing device;
   a plurality of delivery routes stored in a memory associated with the computing device, each delivery route having a plurality of stops; and
   a stop insertion application executable in the computing device, the stop insertion application being configured to:
      determine an area of consideration surrounding an optional stop, the area of consideration falling within a predefined radius from the optional stop;
      for each pair of stops for each delivery route included within the area of consideration, determine whether the optional stop can be inserted between the pair of stops in at least one of the delivery routes without violating a predefined set of criteria, wherein the optional stop is to be implemented to pick up an empty tote used to deliver at least one item, wherein the predefined set of criteria further comprises:
         whether an insertion of the optional stop between the pair of stops results in a delay for the selected one of the delivery routes that is greater than a predefined threshold;
         whether an insertion of the optional stop between the pair of stops causes a delay that breaks a promise to deliver within a predefined window of time associated with one of the stops; and
         whether a first one of the pair of stops is within a predefined distance of the optional stop; and
      insert the optional stop between a respective pair of stops in a selected one of the delivery routes.

2. The apparatus of claim 1, wherein the selected one of the delivery routes in which to insert the optional stop is the delivery route in which the insertion of the optional stop results in a minimum of disruption for the delivery route.

3. A method, comprising the steps of:
   providing a plurality of delivery routes in a computing device, each delivery route having a plurality of stops;
   determining in the computing device an area of consideration surrounding an optional stop, the area of consideration falling within a predefined radius from the optional stop;
   identifying in the computing device each stop of each delivery route included within the area of consideration;
   for each stop of each delivery route included within the area of consideration, determining in the computing device whether the optional stop can be inserted between a corresponding pair of stops in accordance with a predefined set of criteria, wherein determining whether the optional stop can be inserted between the corresponding pair of stops in accordance with the predefined set of criteria comprises determining whether an insertion of the optional stop results in a period of time spent between the corresponding pair of stops that is greater than a predefined threshold of time; and inserting in the computing device the optional stop in a selected one of the delivery routes.

4. The method of claim 3, wherein the optional stop comprises a stop to pick up an empty tote used to deliver at least one item.

5. The method of claim 3, wherein the optional stop comprises a driver break to be inserted into a delivery route, wherein the driver break comprises a stoppage of performing delivery work.

6. The method of claim 3, wherein the step of determining whether the optional stop can be inserted between the corresponding pair of stops in accordance with the predefined set of criteria further comprises the step of determining whether an insertion of the optional stop between the corresponding pair of stops results in a delay for the selected one of the delivery routes that is greater than a predefined threshold of delay.

7. The method of claim 3, wherein the step of determining whether the optional stop can be inserted between the corresponding pair of stops in accordance with the predefined set of criteria further comprises the step of determining whether an insertion of the optional stop between the corresponding pair of stops causes a delay that breaks a promise to deliver within a predefined window of time associated with one of the stops.

8. The method of claim 3, wherein of the selected one of the delivery routes in which to insert the optional stop is the delivery route in which the insertion of the optional stop results in a lowest relative disruption for the delivery route.

9. The method of claim 3, wherein the step of determining whether the optional stop can be inserted between the corresponding pair of stops in accordance with the predefined set of criteria further comprises the step of determining whether a first one of the corresponding pair of stops is within a predefined driving time of the optional stop.

10. The method of claim 9, wherein the predefined driving time is determined based upon an average driving speed and a predefined time period.

11. The method of claim 3, further comprising the step of generating the delivery routes in the computing device.

12. An apparatus, comprising:
a computing device;
a plurality of delivery routes stored in a memory associated with the computing device, each delivery route having a plurality of stops; and
a stop insertion application executable in the computing device, the stop insertion application being configured to:
determine an area of consideration surrounding an optional stop, the area of consideration falling within a predefined radius from the optional stop;
identify each stop of each delivery route included within the area of consideration;
for each stop of each delivery route included within the area of consideration, determine whether the optional stop can be inserted between a corresponding pair of the stops without violating a predefined set of criteria, wherein the predefined set of criteria further comprises whether an insertion of the optional stop between the corresponding pair of stops results in a delay for the selected one of the delivery routes that is greater than a predefined threshold; and
insert the optional stop between a respective pair of stops in a selected one of the delivery routes.

13. The apparatus of claim 12, wherein the optional stop comprises a stop to pick up an empty tote used to deliver at least one item.

14. The apparatus of claim 12, wherein the optional stop comprises a driver break to be inserted into a delivery route, wherein the driver break comprises a stoppage of performing delivery work.

15. The apparatus of claim 12, wherein the predefined set of criteria further comprises whether an insertion of the optional stop between the corresponding pair of stops causes a delay that breaks a promise to deliver within a predefined window of time associated with one of the stops.

16. The apparatus of claim 12, wherein the selected one of the delivery routes in which to insert the optional stop is the delivery route in which the insertion of the optional stop results in a minimum of disruption for the delivery route.

17. The apparatus of claim 12, wherein the predefined set of criteria further comprises whether a first one of the pair of stops is within a predefined distance of the optional stop.

18. The apparatus of claim 17, wherein the predefined distance is determined based upon an average driving speed and a predefined time period.

19. The apparatus of claim 12, further comprising a route generation application executable in the computing device, the route generation application being configured to generate the delivery routes.

20. A non-transitory computer readable medium embodying a program executable in a computing device, comprising:
a plurality of delivery routes, each delivery route having a plurality of stops, where a delivery is to be made at each of the stops;
code that determines an area of consideration surrounding an optional stop, the area of consideration falling within a predefined radius from the optional stop;
code that determines, for each pair of stops for each delivery route included within the area of consideration, whether the optional stop can be inserted between the pair of stops in at least one of the delivery routes without imposing a delay in the at least one of the delivery routes that is greater than a predefined time threshold and without breaking a promise to deliver within a predefined window of time associated with one of the stops; and
code that inserts the optional stop between a respective pair of stops in a selected one of the delivery routes.

21. The non-transitory computer readable medium embodying the program executable in the computing device of claim 20, wherein the optional stop comprises a stop to pick up an empty tote previously used to deliver at least one item at the stop.

22. The method of claim 3, wherein the predefined radius is a distance.

23. The method of claim 3, wherein the predefined radius is expressed in terms of a travel time.

24. The method of claim 23, wherein the predefined radius is expressed in terms of average speed based on a location of the area of consideration.

* * * * *

UNITED STATES PATENT AND TRADEMARK OFFICE
CERTIFICATE OF CORRECTION

| | | |
|---|---|---|
| PATENT NO. | : 8,498,947 B1 | Page 1 of 1 |
| APPLICATION NO. | : 12/640516 | |
| DATED | : July 30, 2013 | |
| INVENTOR(S) | : Paul N. Haake et al. | |

It is certified that error appears in the above-identified patent and that said Letters Patent is hereby corrected as shown below:

In the Claims

Column 11, line 32 delete the word "of" after the word "wherein" to read as follows:

-- The method of claim 3, wherein the selected one of the --

Signed and Sealed this
Eighth Day of July, 2014

Michelle K. Lee
*Deputy Director of the United States Patent and Trademark Office*